(12) United States Patent
Ljungmann

(10) Patent No.: US 6,382,693 B1
(45) Date of Patent: May 7, 2002

(54) DEVICE FOR AUTOMATICALLY ATTACHING COVER SLIPS TO MICROSCOPE SLIDES

(76) Inventor: Torstein Ljungmann, Ullevalsveien 16B, 0171 Oslo (NO)

( * ) Notice: Subject to any disclaimer, the term of this patent is extended or adjusted under 35 U.S.C. 154(b) by 0 days.

(21) Appl. No.: 09/714,271

(22) Filed: Nov. 17, 2000

(30) Foreign Application Priority Data

Nov. 17, 2000 (NO) .............................................. 995644

(51) Int. Cl.⁷ .............................................. B25J 15/06
(52) U.S. Cl. ..................................... 294/64.1; 414/627
(58) Field of Search .............................. 294/64.1, 64.2, 294/64.3, 65; 414/627, 737, 752.1; 901/40; 271/95, 106, 107

(56) References Cited

U.S. PATENT DOCUMENTS

| | | | | |
|---|---|---|---|---|
| 3,972,423 A | * | 8/1976 | Tipton | 222/575 |
| 4,428,793 A | * | 1/1984 | Sato et al. | 156/285 |
| 4,518,159 A | * | 5/1985 | Nishibori et al. | 271/103 |
| 5,989,386 A | * | 11/1999 | Elliott | 156/285 |

FOREIGN PATENT DOCUMENTS

| | | | | |
|---|---|---|---|---|
| JP | 61-254434 | * | 11/1986 | ................. 271/106 |
| WO | 94/14097 | | 6/1994 | |
| WO | 95/20176 | | 7/1995 | |

* cited by examiner

*Primary Examiner*—Dean J. Kramer
(74) *Attorney, Agent, or Firm*—Fitzpatrick, Cella, Harper & Scinto

(57) ABSTRACT

A device for automatically attaching cover slips to microscope slides carrying a specimen for microscopic examination and a mounting medium, comprising a lifting mechanism (1) having a holder (2) in which there are mounted a pair of mutually spaced suction cups (3) extending in a vertical plane, and an abutment body (5) arranged between and outside of the suction cups (3) and having a downwards convexly curved abutment surface (6) for abutment against a cover slip (7) retained by the suction cups. The abutment body (5), at and end portion thereof situated laterally outside of the suction cups (3), is rotatably mounted in the holder (2) about an axis (9) extending transversely relative to the vertical plane, and the abutment body (5) is limitedly rotatable in the holder (2) to each side of an essentially horizontal intermediate position.

4 Claims, 4 Drawing Sheets

D1

D2

D3

D4

D5

DEVICE FOR AUTOMATICALLY ATTACHING COVER SLIPS TO MICROSCOPE SLIDES

The invention relates to a device for automatically attaching cover slips to microscope slides carrying a specimen for microscopic examination and a mounting medium, comprising a lifting means having a holder in which there are mounted a pair of mutually spaced suction cups extending in a vertical plane, and an abutment body arranged between and outside of the suction cups and having a downwards convexly curved abutment surface for abutment against a cover slip retained by the suction cups.

On the market there exist several types of machines or apparatuses carrying out glueing of cover slips on microscope slides. An apparatus of this type is known, for example, from the international patent application No. PCT/NO93/00188 (WO 94/14097). In this apparatus, a fetching means for the cover slips comprises a pair of suction cups mounted at a suitable mutual distance in a holder for retaining the end portions of a cover slip, a downwards convexly curved resilient abutment surface being arranged between and outside of the suction cups, So that the suction cups, when activated, pull the underlying cover slip up to a slightly curved position in abutment against the resilient abutment surface.

Another example of such an apparatus is known from the international patent application No. PCT/AU95/00035 (WO 95/20176). A transfer head for cover slips comprises a vertically extending, spring-loaded plunger arranged between a pair of spaced suction cups, the axis of the suction cups being inclined outwardly and downwardly relative to the vertical axis of the plunger, and the plunger, in its downwardly extended position, being below the level of the suction cups, and control means are arranged to control the movement of the transfer head and the suction pressure to one or both of the suction cups.

In machines and apparatuses of the type in question it is important that the period from the time when the tissue specimens are taken out from the staining process until they are sealed, is as short as possible. A dehydration of the specimens results in poorer sealing and readability of the tissue condition, air bubbles then arising in the tissue. The air bubbles trapped during the process of placing a cover slip on a microscope slide with mounting medium thereon, something which frequently occurs with today's systems, normally will not disappear by capillary action only.

The object of the invention is to provide a device which, in a particularly efficient manner, removes air bubbles occurring in the tissue specimens and the mounting medium in connection with attachment of cover glasses on microscope slides.

According to the invention there is provided a device of the introductorily stated type wherein the abutment body, at an end portion thereof situated laterally outside of the suction cups, is rotatably mounted in the holder about an axis extending transversely relative to said vertical plane, and wherein a means is provided causing the abutment body to be limitedly rotatable in the holder to each side of an essentially horizontal intermediate position.

By means of the device according to the invention one achieves a controlled force which moves gradually along the cover slip during the placing thereof on the microscope slide, the abutment body operating as a "rolling shoe" which, by its rotating movement, rolls along the cover slip from one end thereof to the other. In this manner there is achieved that all the trapped air bubbles are guided towards one end of the cover slip, and the air is pressed out from this end by means of the controlled mechanical force from the rolling shoe.

The invention will be further described below in connection with an exemplary embodiment with reference to the drawings, wherein FIG. 1 shows a perspective view of a device according to the invention;

FIGS. 7D1–7D5 show different operational phases in connection with step D in FIG. 6.

Figure 1:
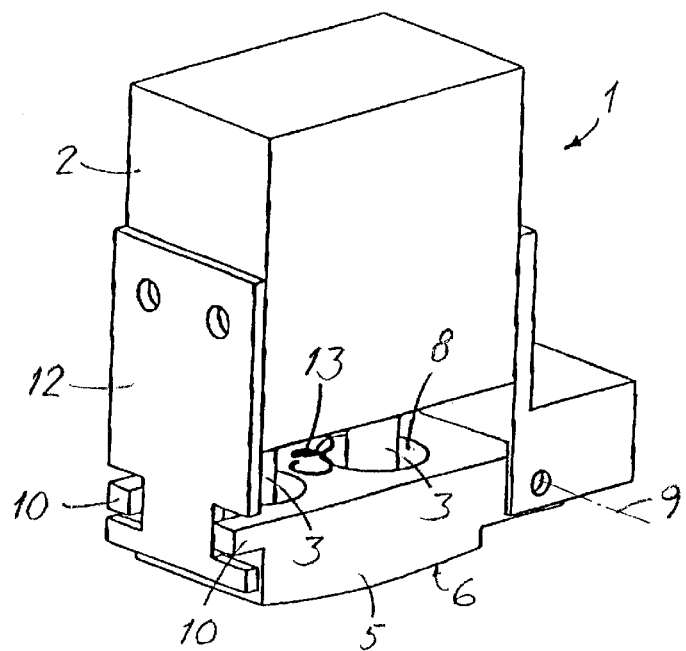

The embodiment of the device according to the invention shown in FIGS. 1–4 comprises a lifting means 1 having a holder 2 in which there are mounted a pair of mutually spaced suction cups 3 located in a common vertical plane P (see FIG. 4) and having downwardly directed suction cup heads 4. Between and outside of the suction cups 3 there is arranged an abutment body 5 which is formed with a downward convexly curved abutment surface 6 for abutment against a cover slip 7 (see FIGS. 6 and 7) retained against the suction cups. In the illustrated embodiment the abutment body 5 is in the form of a block which is provided with through holes 8 for the suction cups. As appears, the abutment surface is convexly curved in a cross-sectional plane parallel with the vertical plane P, but the surface may also be contemplated to be slightly double-curved.

As will be appreciated, the lifting means 1 will be connected to a suitable lifting mechanism (not shown) providing for suitable lifting and lowering movement of the device, as described in connection with FIGS. 6 and 7. Further, the suction cups will be connected to a suitable conventional system for the provision of an adjustable vacuum in the suction cups.

In accordance with the invention, the abutment body 5, at an end portion thereof situated laterally outside of the suction cups 3, is rotatably mounted in the holder 2 about an axis 9 extending transversely relative to the vertical plane P through the suction cups. Further, the abutment body is limitedly rotatable relative to the holder 2, more specifically within a certain angular range on each side of an essentially horizontal intermediate position of the body. For this purpose the abutment body suitably may be provided with at least one projection which is in engagement with an appurtenant groove arranged in the holder 2 and restricting said rotational movement. Thus, the abutment body 5 in the illustrated embodiment, at the opposite end of the body relative to the axis 9, is provided with projections 10 which are in engagement in respective groove-forming cut-outs 11 at opposite side edges of a plate 12 fastened to an adjacent side wall of the holder 2.

Further, the device preferably is provided with a preloading or biasing means seeing that the abutment body 5 is continuously affected downwards, i.e. in the direction towards its most inclined or extreme rotational position. In the illustrated embodiment, the biasing means consists of a suitably biased compression spring 13 arranged between the underside of the holder 2 and a central portion of the abutment body 5 between the suction cups 3. It will be clear that the biasing means may be arranged in different ways.

Instead of the shown spring 13 there may, for example, be used a biased turning spring in connection with the axis of rotation 9. Possibly, the biasing means can be omitted, under the presupposition that the abutment body is manufactured from a sufficiently heavy material.

Figure 2:
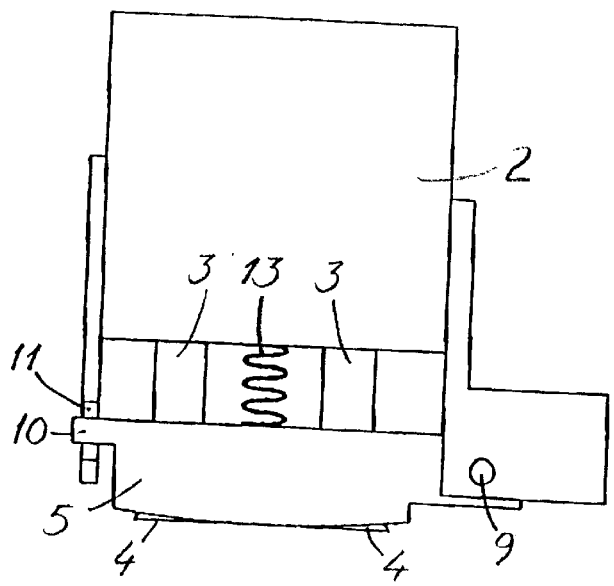
FIGS. 2–4 show a side view, an end view and a bottom view, respectively, of the device in FIG. 1.
Figure 3:
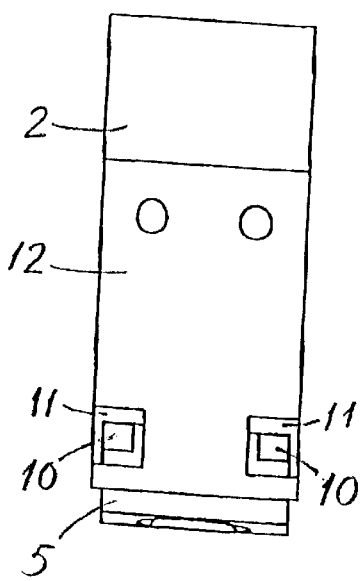
Figure 4:
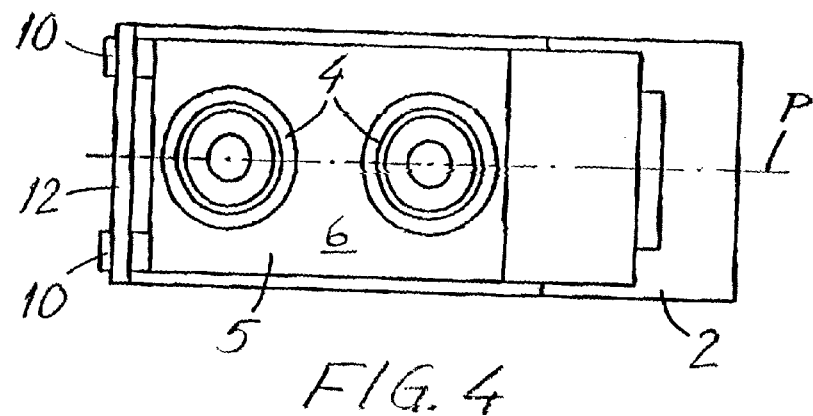
Figure 5:
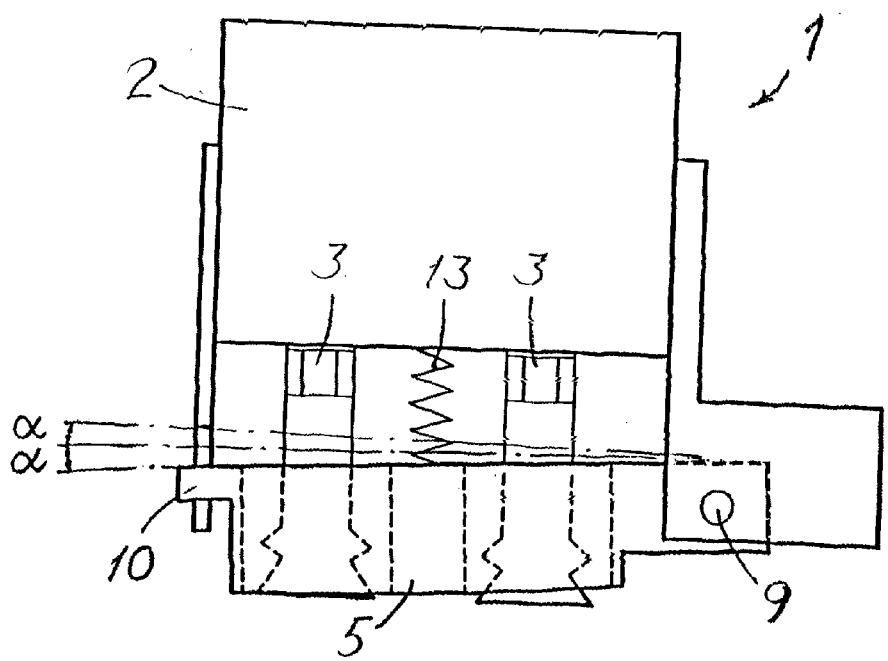
FIG. 5 shows a side view corresponding to that of FIG. 2, with the abutment body shown in its lower extreme position.

FIG. 2 shows the abutment body 5 in said horizontal intermediate position, whereas FIG. 5 shows the abutment body in the extreme rotational position in which the body is lowered a maximum angle of inclination α. The convexly curved surface 6 in the illustrated embodiment has a suitable, fixed radius of curvature, for example a radius of about 2 m when used in a machine for attachment of cover slips having a length of 40, 50, 55 or 60 mm.

When activating the suction cups by the supply of a vacuum, the relevant cover slip is lifted up to abutment against the abutment body 5, and further the abutment body is rotated together with the cover slip about the axis 9 to an upper rotational position, in which the body is raised to a maximum angle of inclination or lifting angle a, as shown in FIG. 5.

Figure 6:
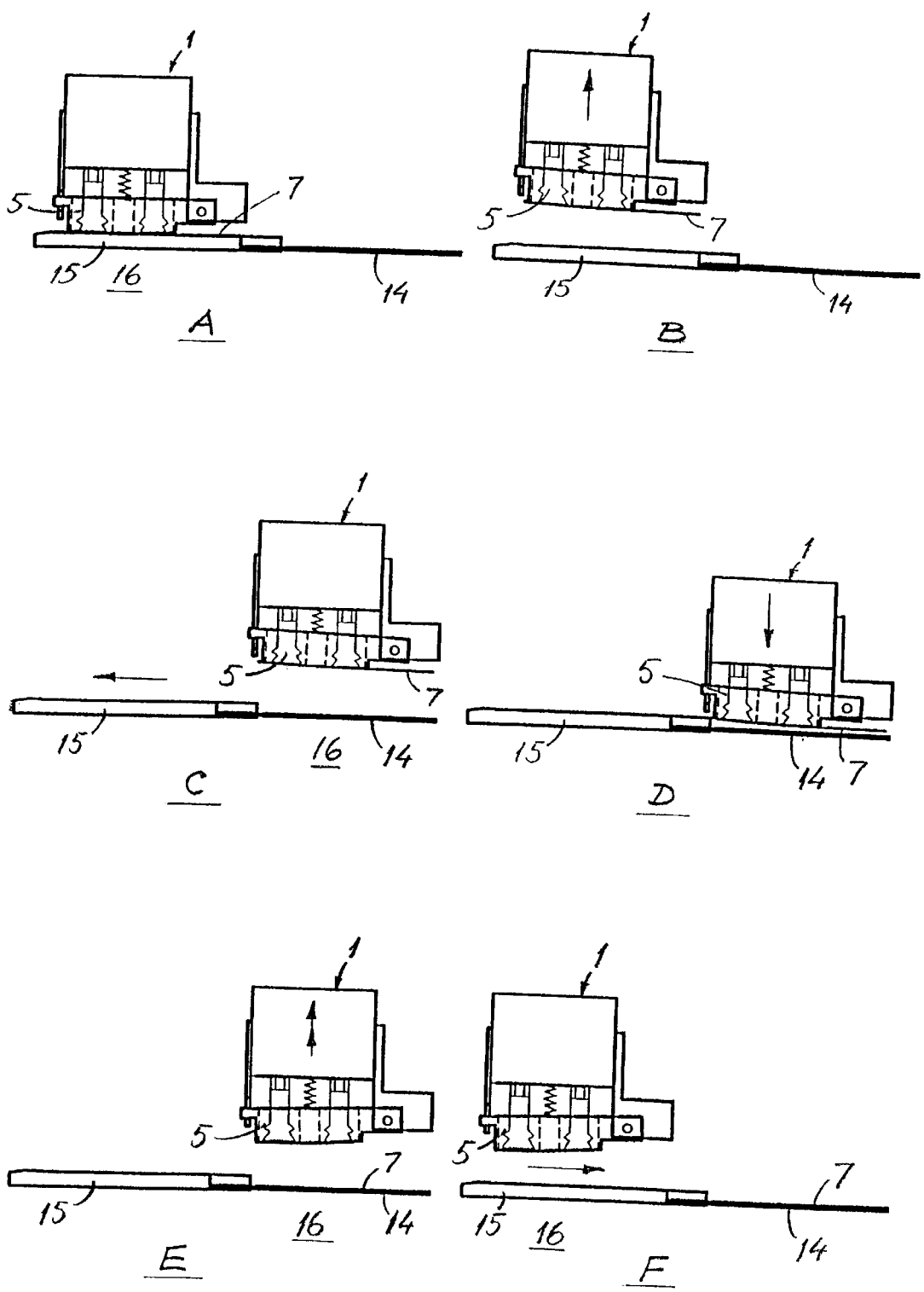
FIGS. 6A–6F show side views corresponding to that of FIG. 5, and show the device in different operating steps A–F during the manipulation of a cover slip and the attachment thereof to a microscope slide.
Figure 7:
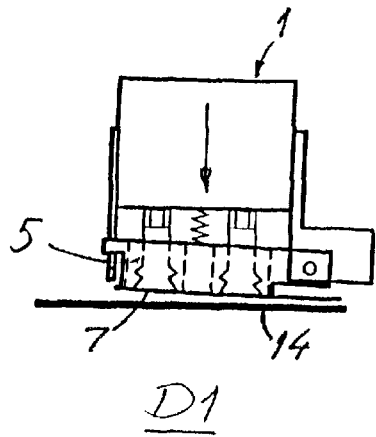
Figure 7:
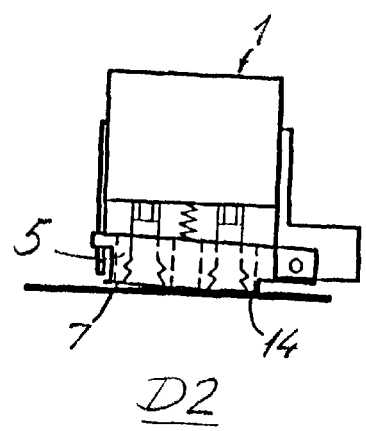
Figure 7:
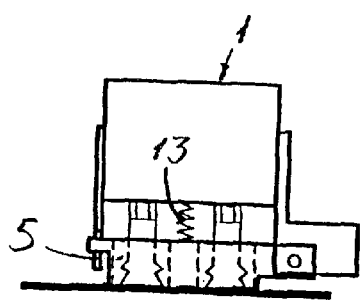
Figure 7:
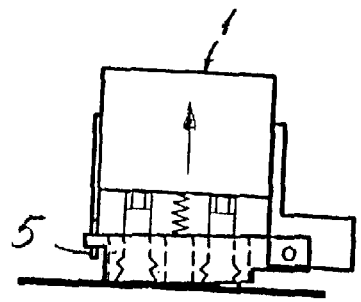
Figure 7:
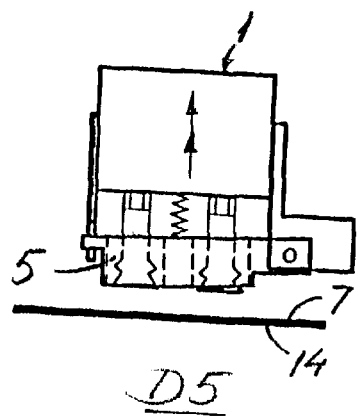

The manner of operation of the device will be further described below, and then in connection with FIG. 6 showing different operating steps A–F during the manipulation of a cover slip, and with FIG. 7 showing different operational phases in connection with step D in FIG. 6.

The operating steps shown in FIG. 6 presupposes the use of a reciprocating slide means 15 for the transport of cover slips 7 and microscope slides 14 onto and away from a working station 16 on which cover slips are glued to microscope slides.

The lifting means 1 is presupposed to be mounted in a suitable position above the working station 16, and the slide 15 is arranged to carry cover slips of the relevant size onto the working station to a fixed position in which the left edge of the glasses is located at the left edge of the abutment body as it is shown in FIG. 6B.

In FIG. 6A the lifting means 1 is lowered towards a cover slip 7 which is placed in the correct position relative to the abutment body 5 under the suction cups of the lifting means. By means of a vacuum the cover slip 7 and the abutment body 5 are lifted to the upper angular position of the body, limited by the grooves 11 in the plate 12 on the left-hand side of the lifting means.

In FIG. 6B the lifting means is moved vertically upwards so that the cover slip 7 is placed in said angle. As mentioned above, the left end of cover slips of different lengths (40, 50, 55 or 60 mm) will be located at the left end of the abutment body 5, which means that the cover glass, over the distance to which a long cover slip protrudes at the right-hand side of the abutment body, will be rectilinear and have an angle of inclination which is given from the tilting position of the abutment body and the curvature of the abutment surface. That part of the cover slip lying under the abutment body, will rest against the abutment surface and be bent in accordance with the radius of curvature of the abutment surface.

In FIG. 6C the slide means 15 has been moved to the left, and a microscope slide 14 with mounting medium (glue) is located on the working station 16 under the lifting means.

In FIG. 6D the lifting means is moved slowly vertically downwards towards the microscope slide with the adhesive and mounts the cover slip with a rolling movement. The different phases of this mounting will be further described below with reference to FIG. 7.

In phase D1 according to FIG. 7, the lowest portion of the linear part of the cover slip touches the microscope slide first and starts the sealing process by means of the inherent spring force of the cover slip.

In phase D2 the downwards directed movement is terminated when the linear part of the cover slip is almost horizontal on the microscope slide. The adhesive and possible existing air bubbles are now pressed in the direction towards the left end of the microscope slide.

In phase D3 the vacuum is released, and the abutment body or rolling foot 5 continues pressing the adhesive and existing air bubbles further towards the left end under the influence of the spring 13.

In phase D4 the lifting means 1 is lifted slowly upwards, and the rolling foot 5 continues pressing adhesive and existing air bubbles in the direction towards the left end of the microscope slide and out of the cover slip area.

Phase D5 according to FIG. 7 corresponds to step E in FIG. 6, wherein the lifting means 1 is lifted quickly upwards from the working station 16.

In step F in FIG. 6, the attachment operation is completed, and the microscope slide 14 with the attached cover slip 7 now is returned to a set position by means of the slide means 15, whereafter the lifting means returns to the position according to step A in FIG. 6.

What is claimed is:

1. A device for automatically attaching cover slips to microscope slides carrying a specimen for microscopic examination and a mounting medium, comprising a lifting means having a holder in which there are mounted a pair of mutually spaced suction cups extending in a vertical plane, and an abutment body arranged between and outside of the suction cups and having a downwards convexly curved abutment surface for abutment against a cover slip retained by the suction cups, wherein the abutment body, at and end portion thereof situated laterally outside of the suction cups, is rotatably mounted in the holder about an axis extending transversely relative to said vertical plane, and wherein a limiting means is provided causing the abutment body to be limitedly rotatable in the holder to each side of an essentially horizontal intermediate position.

2. A device according to claim 1, wherein said limiting means comprises at least one projection provided on the abutment body and being in engagement in an appurtenant groove arranged in the holder and restricting the rotational movement of the abutment body.

3. A device according to claim 1 or 2, comprising a biasing means providing for continuous influence of the abutment body towards an outer rotational position.

4. A device according to claim 3, wherein the biasing means is a suitably biased compression spring arranged between a portion of the holder and a central portion of the abutment body between the suction cups.

* * * * *